Oct. 2, 1962　　　　　　　G. BECKER　　　　　3,056,547
ITEM COUNTER FOR CASH REGISTERS AND OTHER BUSINESS MACHINES
Filed April 25, 1960　　　　　　　　　　　　　8 Sheets-Sheet 3

Oct. 2, 1962  G. BECKER  3,056,547
ITEM COUNTER FOR CASH REGISTERS AND OTHER BUSINESS MACHINES
Filed April 25, 1960  8 Sheets-Sheet 6
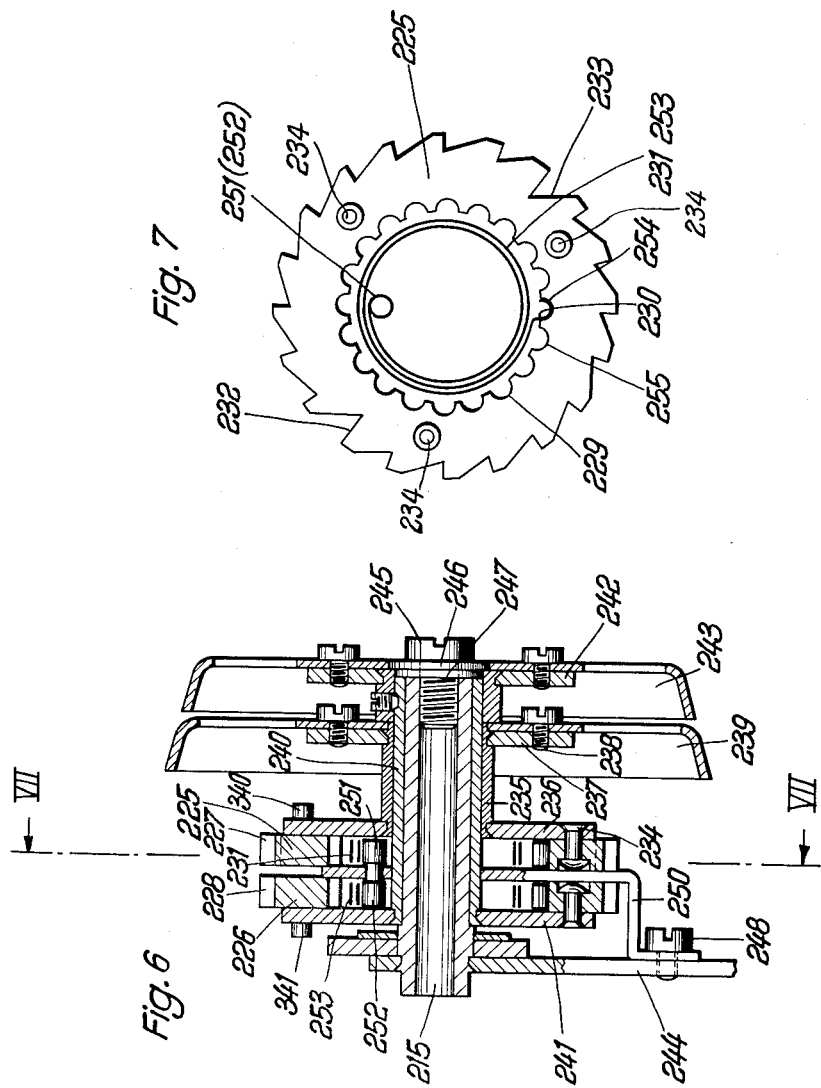

Oct. 2, 1962 G. BECKER 3,056,547
ITEM COUNTER FOR CASH REGISTERS AND OTHER BUSINESS MACHINES
Filed April 25, 1960 8 Sheets-Sheet 7

Oct. 2, 1962 G. BECKER 3,056,547
ITEM COUNTER FOR CASH REGISTERS AND OTHER BUSINESS MACHINES
Filed April 25, 1960 8 Sheets-Sheet 8

United States Patent Office 3,056,547
Patented Oct. 2, 1962

3,056,547
ITEM COUNTER FOR CASH REGISTERS AND
OTHER BUSINESS MACHINES
Gerhard Becker, Bielefeld, Germany, assignor to Anker-Werke Aktiengesellschaft, Bielefeld, Germany, a corporation of Germany
Filed Apr. 25, 1960, Ser. No. 24,485
Claims priority, application Germany Apr. 24, 1959
15 Claims. (Cl. 235—7)

My invention relates to cash registers, accounting machines and other business machines for registering and totalizing multiple-item transactions, and will be described hereinafter with particular reference to the example of a cash register. In a more particular aspect, my invention concerns an item counting device which indicates the number of individual sales or other transaction items that are being totalized in such a machine.

In self-service stores, a reliable and rapid performance of the cashing and checking operations at the check-out counters is of prime importance, particularly during rush hours. Hence it is desirable to equip the cash register with an item counting device which indicates the number of individual sales items as they are being registered and totalized, so that the cashier as well as the customer can readily check the number of goods or packages for which payment was made and which are to be wrapped.

Among the known item counters in accounting machines and cash registers are those that, when a given transaction key is being depressed, advance one counted unit and that are manually set back to the zero position at the close of a business day or any other desired time. Such item counters are of no assistance during cash transfer from an individual customer.

There are also recording adding machines equipped with an item counting device to be switched on by special control members when a counting of items is desired. This item counter is automatically disconnected and zeroed as soon as totals or sub-totals are drawn or the machine is operated for an idle run as may be necessary, for example, when a blank space is to be left on the recording tape.

It has also become known to provide cash registers with item counters for indicating the number of items to be totalized for a multiple-item sale. These item counters are returned to zero when a total is being drawn, so that a subsequent checking of the number of items is not possible once the cash-register operation for a particular sale is completed.

It is an object of my invention to provide an item counting device for cash registers, accounting machines and the like business machinery, which indicates the number of correlated transaction items as they are being entered into the registering or computing units of the machine by actuation of a suitable transaction key, and which thereafter maintains the indication of the counted number of items until after the entire machine operation is completed and as long as no further business transaction is being entered into the machine, thus affording the customer as well as the cashier a convenient checking of the number of items to be passed to the customer.

Another, more specific object of my invention is to provide a cash register, accounting machine or the like with an item counting device that operates under control by the transaction control keys and adding-mechanism selector keys and, upon termination of a multiple-item registering performance by actuation of a totalizer or other transaction control key, will remain in the indicating position occupied after the ultimate item was entered, while being reset automatically to zero at the commencement of a new machine run, whereafter the item counter will advance to the number "1" at the end of the first machine run or will remain in the position "0" depending on whether the new machine run, initiated by actuation of a selected adding-mechanism selector or transaction control key, effects the entering of a sales item or is a machine run not involving the registering of a sale as is the case with an idle (no-sale) run (for opening the cash drawer), or a run for registering an amount of refund.

Still another object of my invention is to have the item counting device exhibit a special indication when a multiple-item performance is terminated thus showing that the number of items then apparent from the counter is the final one and that this indicated number will be cleared when the next business transaction is being entered into the machine.

The foregoing and further objects and advantages of my invention, as well as its essential features, said features being set forth with particularity in the claims annexed hereto, will be apparent from, and will be mentioned in, the following description with reference to the drawings which illustrate by way of example a preferred embodiment of my invention, and wherein:

Figure 1:
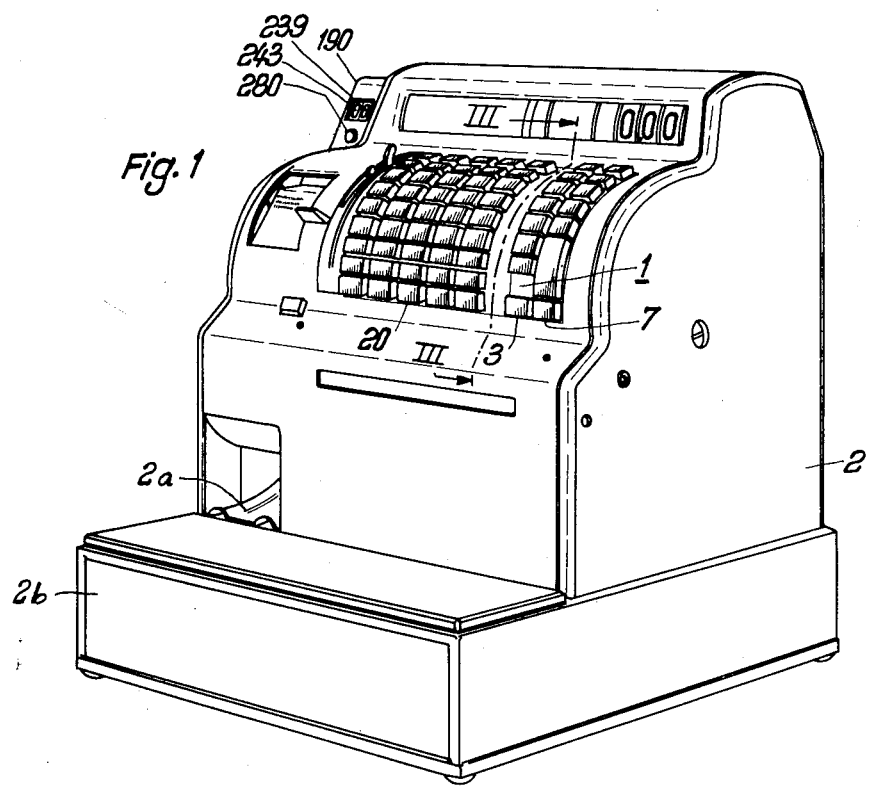
FIG. 1 is a perspective view of a cash register equipped with the item counting device of the invention.
Figure 3:
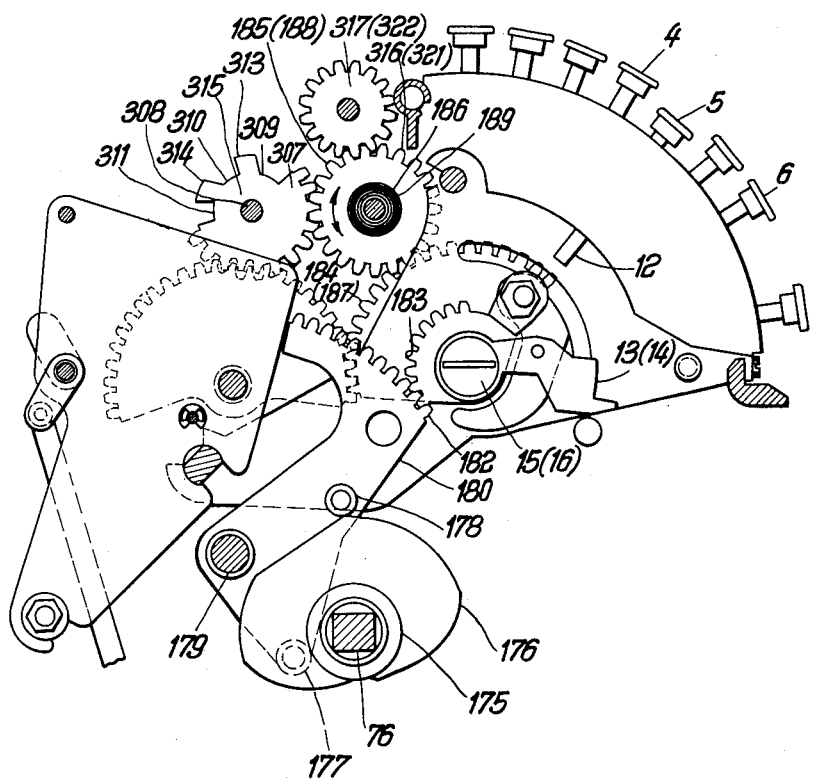
Figure 4:
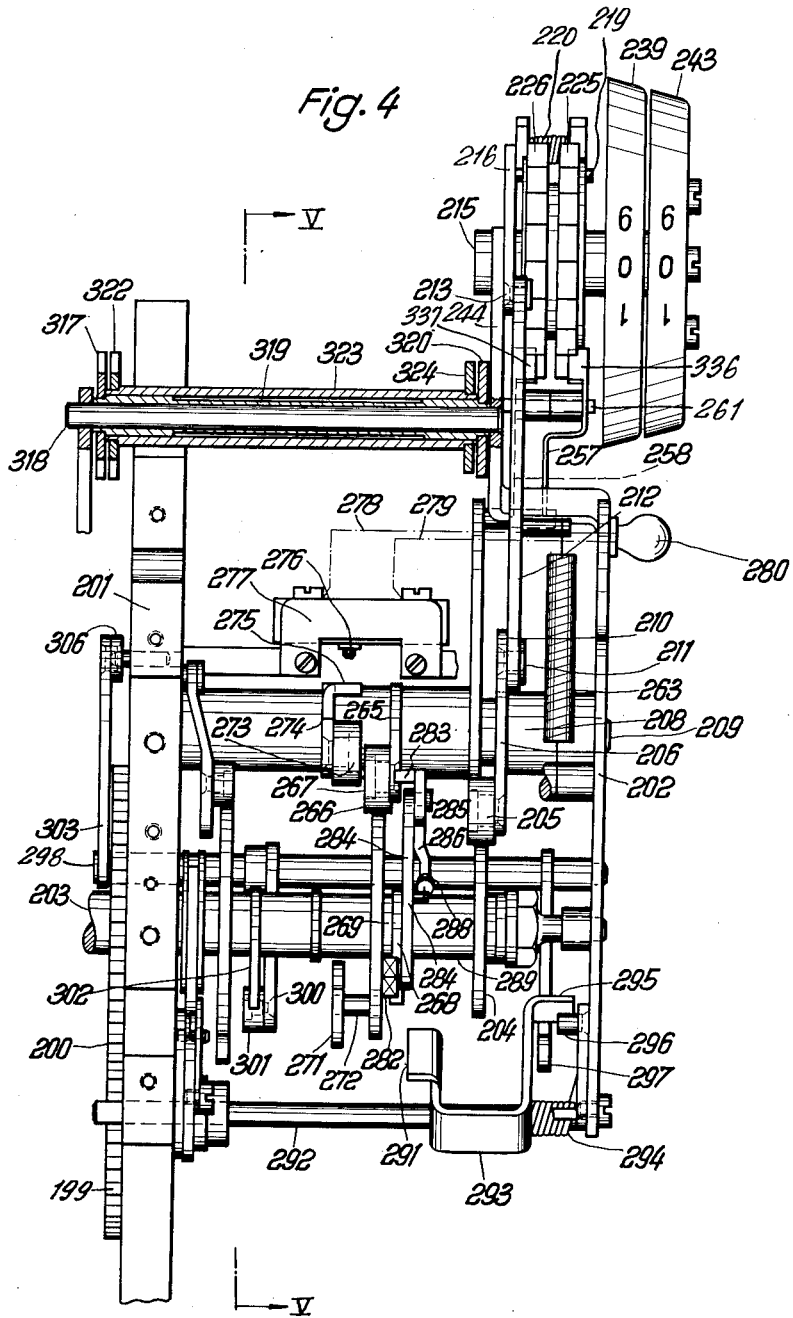
Figure 5:
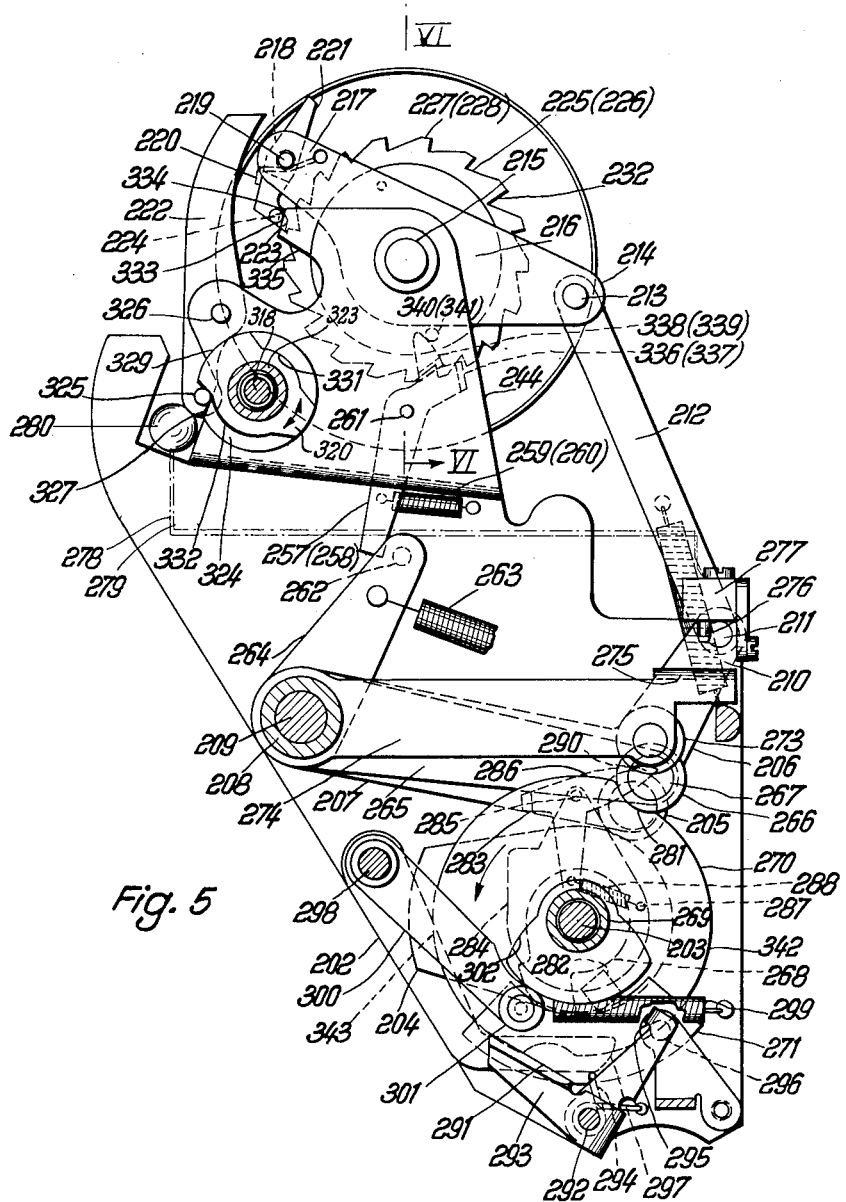

FIG. 3 is a partly sectional side view showing the bank of operation control keys and associated drive and control mechanism, the section being in the plane identified by the line III—III in FIG. 1; FIG. 4 is a partial rear view of the cash register with the machine housing removed to show the operating mechanism of the item-counting device; FIG. 5 is a section on line V—V in FIG. 4.

FIG. 6 shows details of the item counter by a front view onto a section taken along line VI—VI in FIG. 5; and FIG. 7 illustrates details of the item counter in a fragmentary sectional view along line VII—VII in FIG. 6.

Figure 8:
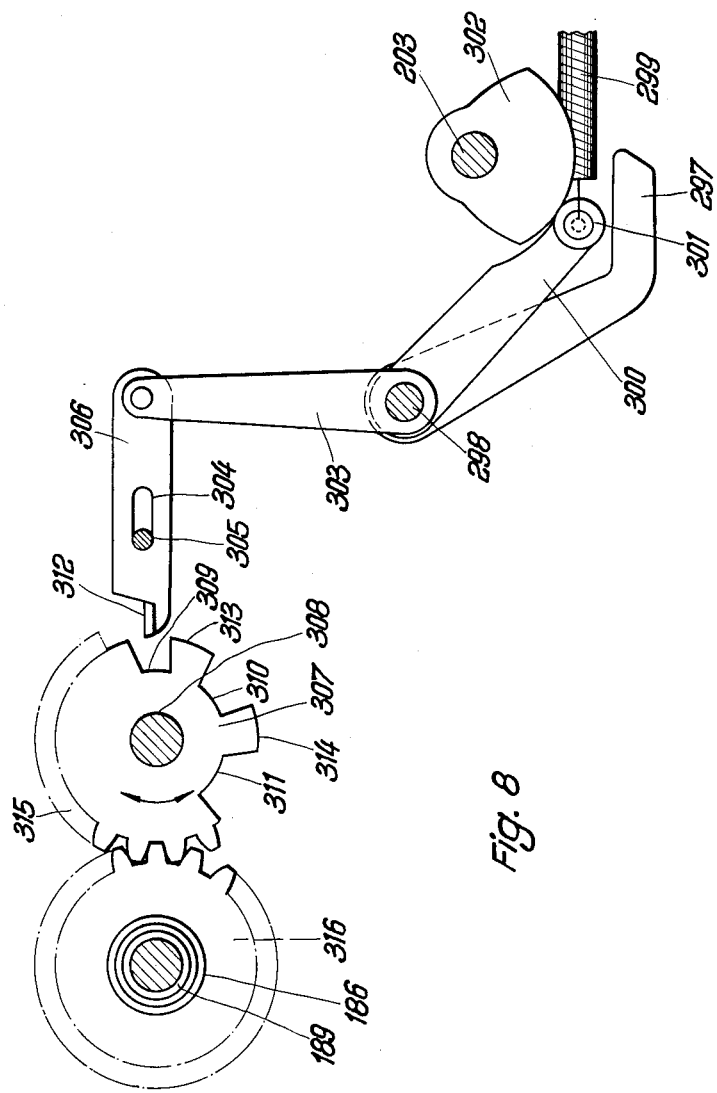

FIG. 8 is a schematic view of the control mechanism of the item counting device in side elevation, and partly in section.

Figure 9:
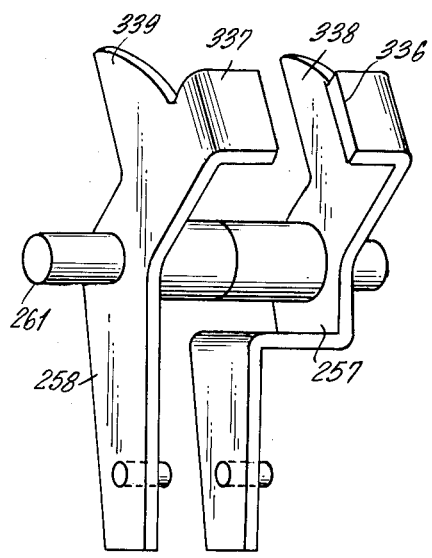
Figure 10:
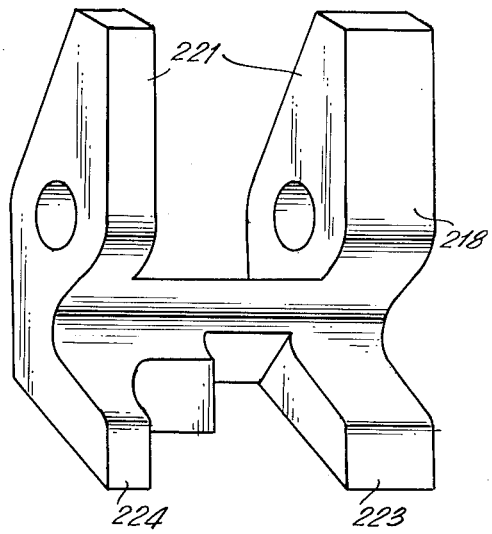
Figure 11:
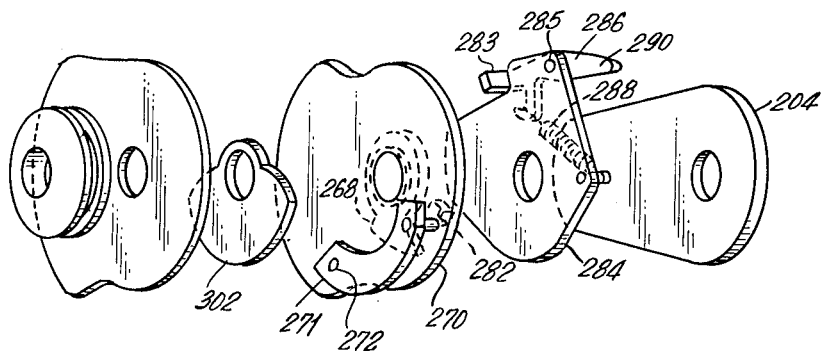

FIGS. 9, 10 and 11 are respective perspective views of details forming part of the mechanisms mainly shown in FIGS. 4 and 5.

The illustrated cash register (FIG. 1) is of a type commonly employed in stores and equipped with a keyboard 1, the usual counting and calculating mechanisms, a mechanism for printing sales checks and issuing them through an opening 2a, and a cash drawer 2b which opens automatically upon completion of a machine run. The working parts of the cash register are enclosed in a housing 2 and are actuated under control by the particular keys depressed by the cashier in accordance with a particular business transaction to be registered. The keyboard 1 comprises a bank of vertically aligned transaction selector keys 3 and a vertical bank of adding-mechanism selector keys 7. The amounts to be entered are posted in an amount board 20 comprising a plurality of vertical key banks for the respective digits.

The item counting device with which my invention is particularly concerned is disposed in a housing 190 laterally attached to the main housing 2. Windows in housing 190 (FIG. 1) permit inspection of two counting wheels 239 and 243 and of a signal lamp 280.

The transaction selector bank 3 of the keyboard 1 includes a motor key 4 (total key) for releasing a machine run to furnish a total of amounts previously posted in the amount keyboard 20. Another motor key 5 (sub-total key) when depressed releases a sub-totalizing machine run, and another key 6 in bank 3 causes the amount of change due to a customer to be indicated or printed.

The several keys of the adding-mechanism selector bank 7 control the entry of individual posted amounts into selected special totalizers for classes of goods or services sold. In the cash register illustrated which is intended for use in a self-service supermarket or the like, there are, among others, special totalizers for sales of meat and groceries which are selected by means of respective selector keys 8 and 10. Refunds are separately totalized when the key 9 is depressed, and the amount of cash handed over by a customer is entered and registered when the key 11 is actuated after the cash amount is posted by depressing the proper keys 21 of the amount keyboard 20.

Since the general operation and design of the cash register is known, the component mechanisms for calculating and recording totals and sub-totals, for subtracting the total of a bill from the amount of cash received to arrive at the amount of change to be returned, as well as the check printing and other accessory devices, they have been illustrated only to the extent they interact with the item counting mechanism of the invention proper.

FIG. 3 shows the main drive of the cash register, the transaction selector bank, and their mechanical connection with the item counting device in a side elevational, sectional view taken in a plane intermediate the amount keyboard and the transaction selector bank, and looking toward the latter. The sevetal selector keys 4, 5, 6 are radially sildable toward the axis of rotation of a conventional transfer mechanism 15. When a key is depressed, the inward end 12 of its shank projects into the path of rotary movement of an abutment member 13 of the transfer mechanism. A substantially identical transfer mechanism 61 is arranged for cooperation of its abutment member 14 with the keys of the adding mechanism selector bank 7.

The transfer mechanism 15 is of the conventional type as known, for example, from Patent 2,650,023. It includes a driven spur-gear segment 183 meshing with the teeth 182 of a quadrant lever 180 which is pivoted on the frame of the machine by means of a shaft 179. The main shaft 76 of the cash register is driven by an electric motor (not shown) which is actuated in the usual manner for a single run of the machine when a suitable machine-run control key is depressed. The main drive shaft 76 carries two cam plates 175 and 176 which engage respective rollers 177 and 178 mounted on the lever 180 for imparting actuating movement to the transfer mechanism 15.

The transfer mechanism 15 further comprises a driving segment 184 in engagement with a spur gear 185 which is fastened on a tubular shaft 186 (FIGS. 3, 8) and which controls the item counting device as will be more fully described below. The transfer mechanism 15 also includes zero stop pawls which hold the mechanism in the illustrated position during a machine run when none of the keys in the transaction selector bank 3 is depressed.

Figure 2:
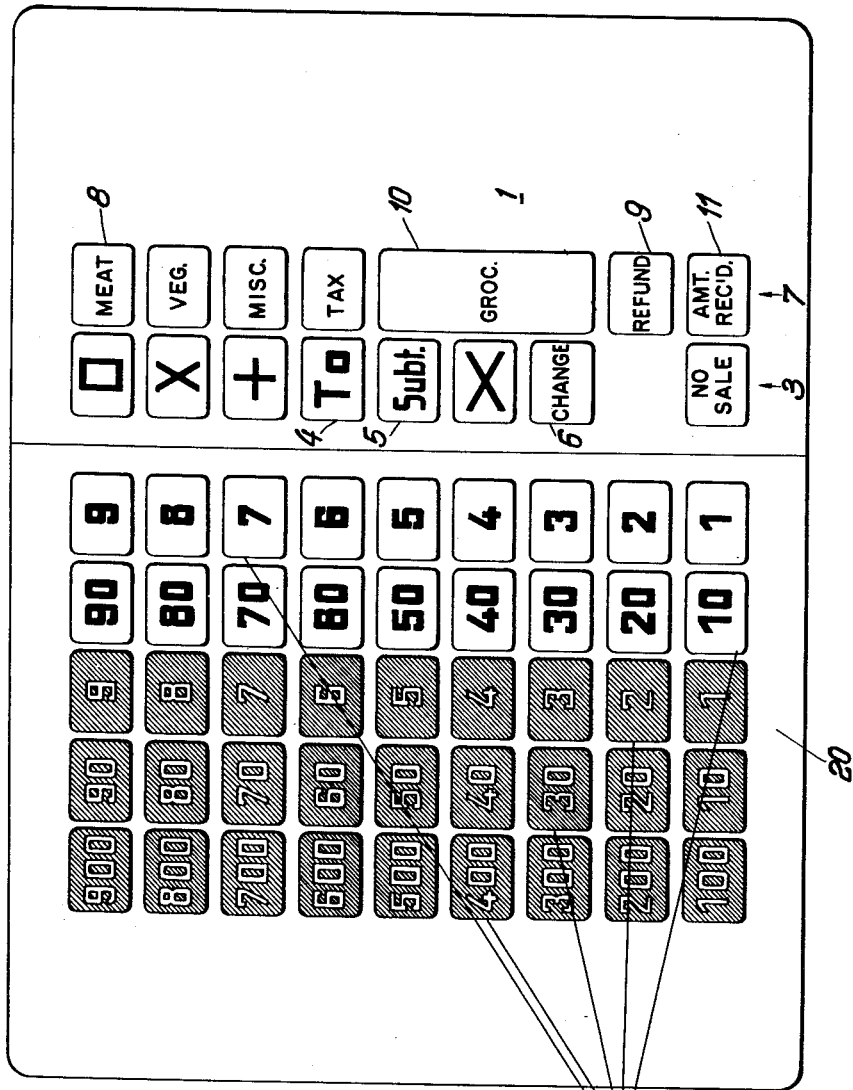
FIG. 2 is a plan view of the keyboard of the cash register.

In an analogous manner, the transfer mechanism 16 for the keys 8 to 11 of the adding-mechanism selector bank 7 (FIGS. 1, 2) is equipped with a driving segment 187 (FIGS. 3, 8) which transmits movement to the item counting device by means of a gear 188 fixed on a tubular shaft 189. The shaft 189 is coaxially rotatable within the shaft 186 and cooperates with the item counting device as described hereafter.

The keys 21 of the amount keyboard 20 do not cooperate directly with the item counting device. The digit banks of keys 21 coact with respective transfer mechanisms, similar to mechanism 15, to set the printing, indicating and adding mechanisms of the machine in known manner.

The main shaft 76 (FIG. 3) has a spur gear (not shown) meshing with a spur gear 200 (FIG. 4) on the drive shaft 203 (FIGS. 4, 5) of the item counting device. Shaft 203 is journalled in the main side frame 201 of the cash register and in a parallel carrier plate 202 outside the main frame. A cam 204 (FIG. 11) fixedly mounted on shaft 203 cooperates with a cam roller 205 (FIGS. 4, 5) journalled on an angular follower lever 206. An arm 207 of lever 206 has a sleve 208 rotatable on a shaft 209 fastened between the side frame 201 and the carrier plate 202. The other arm 210 of lever 206 carries a pin 211 pivotally engaged by an elongated linking rod 212.

A bracket 244 (FIGS. 4, 5, 6) is fastened to the top of the carrier plate 202 and carries a fixed tubular shaft 215. A double-armed rocker 216 is rotatable on shaft 215 (FIGS. 5, 6). One arm 214 of rocker 216 is articulately joined with linking rod 212 by a pivot pin 213. A double-tongued pawl 218 (FIGS. 5, 10) is tiltably mounted on the other arm 217 of the rocker 216 by a pin 219, and is urged counterclockwise (FIG. 5) by a spring 220.

The two tongues 223 and 224 of the pawl 218 are of different size and are urged by spring 220 into engagement with the teeth of two respective ratchet wheels 225 and 226 (FIGS. 4, 5, 6, 7) which are coaxially rotatable on the hollow shaft 215. The pawl 218 also carries a short lateral lug bar 333 (FIG. 5) adjacent the tongues 223 and 224. The pawl 218 as an extension 221 engageable by a releasing lever 222 which is pivotally mounted on a pin 326 secured to the bracket 244.

The ratchet wheels 225 and 226 have annular shape (FIGS. 6, 7). Each has twenty external teeth. Two diametrically opposite notches 232 and 233 in the circumference of the wheel 225 are substantially deeper than the notches between the other teeth of the wheel 225. Both wheels have notches between the other teeth of the wheel 225. Both wheels have internal teeth formed by twenty semi-circular notches 229, 254, 255. The internal gearing of each ratchet wheel is engaged by the conforming crimped free end portion 230 of a spiral spring 231 or 253. The other ends of the spiral springs are secured to respective twin studs 251, 252 mounted on an angularly bent support plate 250 (FIG. 6) which extends between the two ratchet wheels and is fastened to the bracket 244 by screws, such as the one denoted by 248.

During each rotation of the drive shaft 203 the cam 204 (FIGS. 4, 5, 11), acting through the roller 205 and the lever 206 pivoted on shaft 209, causes the linking rod 212 to pivot the rocker 216 once back and forth on shaft 215, thus advancing the ratchet wheel 225 by one tooth. The tongues 223 and 224 of the pawl 218 are shaped in such a manner that the tongue 224 can engage a tooth 228 of the wheel 226 only when the tongue 223 engages one of the deep notches 232 or 233 of wheel 225. When the tongue 223 engages one of the other, shallower notches, the tongue 224 remains out of range of the teeth 228 and makes an idle stroke. The two deep notches 232 and 233 on wheel 227 are spaced from each other by nine shallow ones. Hence, the ratchet wheel 228 will move one step whenever the wheel 227 completes a tenth step (tens transfer).

The wheel 225 (FIG. 6) is riveted at 234 to a flange 236 fastened to one end of a hollow shaft 235 coaxially rotatable on the fixed rocker shaft 215. The other end of the shaft 235 carries a flange 237 to which a counting wheel 239 is fastened by screws 238. The wheel is peripherally marked with two consecutive series of numerals "0" to "9" corresponding to the twenty ratchet teeth of wheel 225. Subdividing the periphery of the wheels 225 and 239 into twenty sectors is desirable because it permits operation with a relatively short stroke of the rocker 216. However, the number of teeth and the corresponding number of indicia may also be limited to a single group of ten.

A tubular shaft 240 is revolvably interposed between the fixed rocker shaft 215 and the hollow shaft 235, and is equipped with flanges 241 and 242 to which the ratchet wheel 226 and a counting wheel 243 respectively are secured in the same manner as described above with reference to wheels 225 and 239. A fastening screw 245 in threaded engagement with an axial bore of shaft 215 supports two spacer rings 246 and 247 which prevent axial displacement of shafts 235 and 240 on shaft 215.

When the ratchet wheels 225 and 226 are being rotated by the described rocker mechanism in a counterclockwise direction as viewed in FIG. 7, the corresponding spiral spring 231 or 253 is tensioned until its stored force is sufficient to cause the crimped end portion 230 to jump from the previously engaged notch 254 to the next notch 255. The spiral springs are thus kept pre-tensioned during operation of the item counting device, but are always protected from overloading.

Two detents 257 and 258 (FIGS. 4, 5, 9) are pivoted on a pin 261 fixed to the bracket 244. The detents engage the teeth 227 and 228 of the respective ratchet wheels 225 and 226 and secure them in their advanced position against the opposing force of the spiral springs 231 or 253 after each forward step actuated by the twin pawl 218. The detents 257, 258 are urged into engagement with the ratchet teeth by respective helical springs 259, 260 mounted on bracket 244. The detents are lifted off the ratchets 225, 226 by the synchronized movement of a dog pin 262. The pin is mounted transversely on one arm 264 of a bell crank lever 265 which is rotatably mounted on the shaft 209, and is urged away from the detents 257, 258 by a helical tension spring 263 secured to the bracket 244. The other arm of bell crank lever 265 carries a cam-follower roller 266 (FIGS. 4, 5) rotatably mounted on a pin 267 and held by spring 263 against the contour of a cam 270 (FIGS. 4, 5, 11). Cam 270 is mounted on a sleeve 269 rotatably seated on the control shaft 203.

Each of the detents 257 and 258 has a rectangularly bent end portion 336 or 337 (FIGS. 4, 5, 9) engageable with the corresponding ratchet wheel 225 or 226, and an offset latch portion 338, 339 which cooperates with a pin 340 or 341 eccentrically fastened on wheel 225 or 226. The latch portions 338, 339 extend so far toward the axis of the shaft 215 that they securely prevent the ratchet wheels from clockwise movement under the force of the spiral springs 231, 253 even when the end portions 336, 337 travel over the outermost portions of the teeth 227, 228. During counterclockwise rotation of the ratchet wheels 225, 226 the detents 257, 258 can move clockwise about their common pivot 261 and against the force of springs 259, 260 so as to pass out of the paths of the pins 340 and 341.

The cam 270 has two approximately semi-cylindrical contour portions 342 and 343 of which the latter has a larger radius than the former. A segmentally shaped cam 271 (FIGS. 4, 5) is eccentrically mounted on, and axially spaced from, the cam 270 by means of spacer studs 272 (FIG. 4). The cam 271 cooperates with a roller 273 (FIG. 4, 5) mounted on the central portion of an arm 274 one end of which is rotatably mounted on the shaft 209. The other end has a laterally projecting lug portion 275 which is moved toward and away from the actuating pin 276 (FIG. 4) of an electric control switch 277 as the cam 271 engages and releases the roller 273. The switch, secured to the side frame 201, serves to connect a signal lamp 280 by conductors 278 and 279 with an electric current source (not shown). Switch 277 is normally open and is closed only when the pin 276 is depressed by the portion 275 of the arm 274, whereby the signal lamp 280 is lit.

To prevent rotation of the sleeve 269 due to frictional entrainment by the shaft 203, the contour of cam 270 has a notch 281 which receives the follower roller 266 when the machine is at rest so that the tension of spring 263 then prevents undesired movement of cam 270.

A square stop 282 is eccentrically mounted on a flat surface of cam 270 and protrudes laterally toward an indexing disc 284 (FIG. 4).

The disc 284 is fixed on control shaft 203 and is spaced from cam 204 by a spacer sleeve 289. The center portion of an entrainer 286 is eccentrically pivoted to the disc 284 by a pin 285 (FIGS. 4, 5, 11). The entrainer 286 has three arms. One arm extends in a generally radially inward direction relative to the disc 284 and has its end urged counterclockwise (FIG. 5) by a helical spring 288 fastened to the disc 284 by a pin 287. A second arm 283 of entrainer 286 has a lateral lug portion which moves into and out of a circle of contact with the square stop 282 of cam 270 as the entrainer 286 turns about its pivot pin 285.

Movement of the entrainer 286 against the force of spring 288 is effected during rotation of disc 284 when the third arm 290 (FIGS. 5, 11) of the entrainer 286 strikes a lug portion 291 (FIGS. 4, 5) of a rocking lever 293 rotatably mounted on a rod 292 which connects the carrier plate 202 with the main side frame 201. A spring 294 biases the lever 293 clockwise relative to FIG. 5 and thus tends to place a second lug portion 295 of lever 293 into contact with a stationary stop 296 (FIG. 4) mounted on plate 202 for limiting the lever motion.

The lug portion 295 cooperates with a latch arm 297 (FIGS. 4, 5, 8) fastened to a control shaft 298 which is journaled in the side frame 201 and the carrier plate 202. The same shaft 298 also carries a cam follower 300 with a roller 301 urged by a tension spring 299 into contact with a control cam 302 (FIGS. 4, 5, 8, 11) fastened on the drive shaft 203.

The control shaft 298 protrudes somewhat through the main side frame 201 into the part of the cash register normally covered by the housing 2. A radially elongated arm 303 is fastened to the protruding end of control shaft 298 and is pivotally linked to a flat, elongated feeler member 306 (FIGS. 4, 8). The feeler member 306 has an elongated slot 304 by means of which it is guided on a pin 305 protruding from the main side frame 201 (FIGS. 8, 4). The length of the slot 304 limits the maximum longitudinal displacement of the feeler member 306 to that commensurate with the effect of the control cam 302.

The feeler member 306 has an end portion 312 which is offset at right angles from the main portion of the member and extends into an area of alignment with a control disc 307 of basically circular contour. Three deep notches 309, 310, and 311 are spaced along one half of the circumference of the disc 307 with broad teeth 313 and 314 (FIGS. 8, 3) between the notches. In the position illustrated in FIG. 8, the end portion 312 of the feeler member 306 is aligned with the notch 309 of disc 307 and is free to move toward the left, under the force of spring 299 within the limits set by abutment of the cam 302 against the roller 301. When the control disc 307 which is rotatably mounted on the main side frame 201 by means of a shoulder screw 308 is angularly displaced from the position shown, one of the teeth 313 and 314 may face the end portion 312 of feeler member 306 and prevent the latch lever 297 from moving counterclockwise from the position illustrated in FIG. 8 even when the control cam 302 moves out of engagement with the roller 301.

The second half of the circumference of the disc 307 carries a gear segment 315 meshing with a spur gear 316 (FIGS. 8, 3). The gear 316 is fixedly mounted on the outer one (186) of the two coaxial hollow shafts 186, 189 which is driven by engagement of the gear wheel 185 with the driving segment 184 of the selector mechanism 15 as described above in connection with FIG. 3. Thus the control disc 307 is set by depressing any one of the transaction selector keys in bank 3 (FIGS. 1, 2) of the keyboard.

The spur gear 316 also meshes with a pinion 317 (FIGS. 3, 4) mounted on one end of a hollow shaft 319 (FIGS. 4, 5) which is revolvably seated on a fixed shaft 318 fastened between the bracket 244 (FIG. 4) and the main side frame 201. The other end of shaft 319 carries a cam disc 320 (FIGS. 4, 5).

It will be remembered that the inner one (189) of the pair of coaxial hollow shafts 186, 189 (FIGS. 8, 3) is connected to the transfer mechanism 16 in a manner analogous to the connection of the outer shaft 186 to the transfer mechansm 15. The inner hollow shaft 186 carries a spur gear 321 (FIG. 3) analogous to the spur gear 316 and meshing with another spur gear 322 (FIGS. 3, 4) mounted on a hollow shaft 323 (FIGS. 4, 5) coaxially enveloping the shaft 319. The end of the shaft 323 adjacent the bracket 244 carries a cam disc 324 coaxially adjacent to cam disc 320.

The cam discs 320 and 324 are engageable by a pin 325 (FIG. 5). Movement of the pin 325 along the contours of the cam discs 320 and/or 324, as the latter rotate with their respective hollow shafts 319 and 323, causes the releasing lever 222 to perform angular motion about its pivot pin 326. Clockwise movement of lever 222 from the position illustrated in FIG. 5, due to engagement of the pin 325 by a cam face portion of large radius, forces the free end of the lever 222 against portion 221 of pawl 218 and withdraws the pawl tongues 233 and 234 from the respective ratchet wheels 225 and 226. The cam disc 320 is circular and has only one notch 327 into which the pin 325 can drop in the rest position of the machine as illustrated in FIG. 5. The cam disc 324 has two circular cam face sections 329 and 330 of greater diameter separated from each other by two circular face portions 331 and 332 of smaller diameter.

In the rest position of the apparatus, the aforementioned lug 333 of pawl 218 engages a straight guide face 334 of the bracket 244. The guide face is substantially tangential relative to the rocker shaft 215. When the lug 333 travels counterclockwise from the position illustrated in FIG. 5 while the rocker 216 is being actuated by the link 212, the lug 333 is urged by the spring 220 to move along a radially slanting guide edge 335 (FIG. 5) of the bracket 244. As long as the lug 333 is located on the straight face portion 334, the tongue 223 cannot engage the teeth of ratchet wheel 225. As mentioned above, the other tongue 224 cannot engage the teeth of the ratchet wheel 226 unless the tongue 223 drops into one of the deeper notches 232 or 233 of wheel 225.

The operation of the device will now be described with reference to an example of a sales transaction.

For the purpose of this example, it is assumed that a customer is to be billed for twelve items purchased which include several items each of meat and groceries. The cashier first posts the price of the first meat item into the keys 21 of the amount keyboard 20. He then depresses the motor key 8 to select the adding mechanism "meat" in bank 7. This releases a machine run which causes the posted amount to be entered in a subtotalizing counter "meat" and into the main adding mechanism, and the amount is imprinted on a check tape and is indicated in a window as usual.

When the machine run commences, the drive shaft 203 is driven from the main shaft 76 through gear 200. As viewed in FIG. 5, the rotation of drive shaft 203 is counterclockwise and is transmitted to the cam 204, the indexing disc 284, and the control cam 302, all fixed on shaft 203.

After the cam 204 has moved through approximately one half of a turn from the initial position illustrated in FIG. 5, it causes a radially outward movement of the cam follower 205, whereby the angle lever 206 is pivoted about the shaft 209, and the resulting movement of the link 212 causes the rocker 216 to pivot counterclockwise about the shaft 215.

Since, aside from the amount keys 21, only the "meat" key 8 in the computer selector bank 7 has been depressed; but no transaction selector key in bank 3, only the transfer mechanism of bank 7 has become activated, whereas no movement occurred in the transfer mechanism of bank 3. Hence, the cam 320 (FIG. 5) geared to the inactive transfer mechanism 15 remains in the position shown in FIG. 5. In the actuated transfer mechanism 16 of computer selector bank 3, the abutment member 14 (FIG. 3) is rotated until it strikes the shank end 12 of the depressed "meat" key 8. This movement is transmitted through segment 187 and gears 188, 322 to the cam 324 (FIG. 4). Cam 324 is rotated counterclockwise (FIG. 5) until the face section 331 is brought into engagement with the pin 325 whereby the lever 222 assumes the position illustrated in FIG. 5 after having moved clockwise during the initial phase of the machine run.

During the counterclockwise movement of the rocker 216, the lug 333 on pawl 218 travels beyond the end of the straight guide face portion 334 of bracket 244, whereupon the tongue 223 is urged by the spring 220, into a notch of the ratchet wheel 225 and indexes the wheel by one tooth in the counterclockwise direction, whereas the tongue 224 remains out of engagement with the wheel 226.

Simultaneously the lateral end portion 336 of the detent 257 is urged by the spring 259 into engagement behind the next tooth 227 and thus again arrests the ratchet wheel 225. The counting wheel 239 rotates jointly with ratchet wheel from the original position in which the figure "zero" appeared in the window of the housing 190, to the next position in which the figure "one" is shown. The counting wheel 243 remains in its original "zero' position.

As mentioned, the abutment member 13 in transfer mechanism 15 of the transaction selector bank 3 was prevented by its zero stop pawl from participating in the machine movement since no transaction selector key was depressed. Hence the spur gear 316 remains in its starting position shown in FIG. 3. In this position the end portion 312 of the feeler member 306 faces the notch 311 of the control disc 307. When the control cam 302 releases the cam follower lever 300 during rotation of the drive shaft 203, the spring 299 turns the control shaft 298 counterclockwise, as viewed in FIGS. 5 and 8; and the end portion 312 of the feeler member 306 moves towards the control disc 307 until it abuts against the bottom of the notch 311.

The movement of the control shaft 298 is transmitted to the latch lever 297 (FIGS. 8, 5, 4) which moves in to a position in which its free end is located adjacent the second abutment portion 295 (FIG. 4) of the bell crank lever 293 (FIGS. 4, 5) which is thereby arrested.

The indexing disc 284 also partakes in the movement of the drive shaft 203, and the entrainer 286 is moved on a circular path adjacent the cam disc 270 which is held stationary by the cam follower roller 266 on the bell crank lever arm 265. The third arm 290 of the entrainer 286 cams with the first abutment portion 291 of the arrested bell crank lever 293, and the entrainer is pivoted clockwise, as viewed in FIG. 5, about the pin 285 so that it clears the square lug 282 (FIGS. 5, 4) on cam disc 270.

Nine additional items are then posted consecutively by the cashier into the amount keys 21, and nine corresponding machine runs are released by depression of adding mechanism selector keys 8 and 10 respectively. During each run the counting wheel 239 is advanced by a value of "one" corresponding to one tooth of the ratchet wheel 225, as described above. When the tenth item is entered, the tongue 223 of the pawl 218 drops into a deep notch 232 of the ratchet wheel 225, and thus brings the tongue 224 into a position of engagement with one of the teeth 228 of the ratchet wheel 226 which then advances the counting wheel 243 from the position "zero" to the position "one" while the counting wheel 239 moves from "nine" to "zero." During the subsequent entry of the eleventh and twelfth items only the ratchet wheel 225 and its counting wheel 239 are moved, whereas the ratchet wheel 226 and the counting wheel 243 remain in the position "one."

To complete billing after entry of the twelfth and last item, the cashier depresses the transaction selector key 5 of the transaction selector bank 3 to determine the subtotal, that is, the amount to be paid by the customer. During the ensuing machine run the abutment member 13 of the transfer mechanism 15 rotates into abutting engagement with the inward shank end 12 of the key 5. The movement of the abutment member is transmitted to the cam disc 320 by the gear wheel 185, its shaft 186, the spur gear 316 which is mounted on the shaft 186, and the pinion 317.

The cam disc 320 is rotated clockwise as viewed in FIG. 5 so that the pin 325 is moved radially outward from the notch 327 and causes the releasing lever 222 to move clockwise and to engage the portion 221 of the pawl 218. Movement of the rocker 216 during the machine run thus causes only an idle stroke of the pawl 218, and the values indicated on the counting wheels 239 and 243 are not changed during the sub-totalizing step.

The spur gear 316 simultaneously advances the control disc 307 (FIG. 8) by five teeth until the end portion 312 of the feeler member 306 faces the deep notch 310. The lever 300 is thus free to pivot the control shaft 298, and the latch lever 297 arrests the bell crank lever 293 (FIGS. 4, 5) in the same manner as described above. The cam disc 270, therefore, remains stationary.

If the customer offers in payment an amount of money greater than the amount of the bill so as to require the return of change, the cashier enters the amount received by posting it into the keys 21 and by depressing the key 11. As the machine run starts, the selector mechanism 16 rotates the abutting member 14 into contact with the corresponding shank end 12 (FIG. 3). The sequence of events in the machine is substantially similar to that described above in connection with the entry of the first item, however the arc traversed by the abutment member 14 is different, and the cam disc 324 is rotated into a position in which the pin 325 is engaged by the cam face portion 329 of larger diameter so that the releasing lever 222 is pivoted clockwise from the position illustrated in FIG. 5, and the movement of the rocker 216 does not advance the ratchet wheels and their counting wheels. The indicated number of posted items remains unchanged.

The cashier then depresses the transaction selector key 6 to calculate the amount of change to be returned to the customer.

Since depression of any transaction selector key causes the cam disc 320 to be moved from the only position in which the pin 325 rests in the notch 227, the releasing lever 222 holds the pawl 218 out of engagement with the ratchet wheel 225, and the indicated number of posted items remains unchanged. The control disc 307 is rotated counterclockwise, as viewed in FIGS. 3 and 8, until the end portion 312 of the feeler member 306 faces the tooth 313, so that the blocking lever remains in the position illustrated even though the drive shaft 203 rotates the cam 302 out of engagement with the cam follower 301. The rocking lever 293 is not arrested.

The forces of the springs 263, 294, and 288 are selected in such a manner that the entrainer pawl 286 can displace the crank lever 293 when the pawl rotates with the indexing disc 284. The arm 283 of the pawl 286 abuts then against the square stud 282 after approximately one half turn of the drive shaft 203, whereby the cam disc 270 is entrained through the second half turn of the revolution performed by the shaft 203 during each machine run.

During this movement of the cam disc 270, the cam follower roller 266 moves radially outward from the notch 281 in the disc 270 to the cam face portion 342 which is only slightly more distant from the axis of rotation than the notch 281 so that the tripping pin 262 on the bell crank lever arm 264 is moved towards contact with the detents 257, 258, but does not displace them from the position seen in FIG. 5.

The segmental cam 271 mounted on cam 270 engages the roller 273 on the angular arm 274, and the end portion 275 of the latter actuates the switch 277 to light the signal lamp 280.

It will be understood that the conventional devices of the cash register print and/or indicate the amount of change required. The item counting device of the invention does not move its counting wheels, but the lighting of the signal lamp gives warning that the indicated number of items will be cleared in the next operation.

If the customer has correct change to pay the total amount of the purchase, the calculation of the amount to be returned to the customer is unnecessary, and billing is concluded forthwith when the cashier depresses the transaction selector key 4 to release a machine run in which the total amount of the purchase is entered in the grand totalizer of the cash register in the usual manner. The item counting device operates during this run in substantially the same manner as described above in connection with the runs initiated by depression of key 6, the "change" key. The control disc 307 is again moved into a position in which the end portion 312 of the feeler member 306 is aligned with the tooth 313. It is thus seen that, while the grand total is being drawn, the indicated number of items remains unchanged, but the warning signal is actuated.

When the next customer is to be billed, the cashier posts the price of the first item into the amount keyboard 20, and releases the machine run by depressing the appropriate adding mechanism selector key, for example, the "grocery" key 10.

Since, from the preceding sale, the cam disc 270 is still coupled with the indexing disc 284 (FIG. 4), the rotation of the drive shaft 203 causes the cam follower roller 266 (FIGS. 4, 5) to move on cam 270 outward onto the cam face portion 343 of larger diameter. Simultaneously the segment shaped cam 271 releases the roller 273 so that the switch 277 interrupts the circuit of the signal lamp 280. The radially outward movement of the follower roller 266 turns the bell crank lever 265 so that the dog pin 262 on lever arm 264 actuates the detents 257, 258 during the first half turn of the drive shaft 203.

As viewed in FIG. 5, the detents 257, 258 are thus pivoted clockwise about the rod 261 until their lateral end portions 336 and 337 release the teeth 227, 228 of the respective ratchet wheels 225, 226 whereas the latch portions 338, 339 remain in the respective paths of movement of the stop pins 340, 341. Each ratchet wheel is now free to rotate clockwise under the force of the spiral spring 231 or 253, until the stop pin 340, 341 abuts against the latch portion 338 or 339. The latch portions and pins are so located that the ratchet wheels come to rest when the counting wheels 239 and 243 (FIGS. 5, 6, 1) are reset to the "zero" position.

During the remaining portion of the machine run the drive shaft 203 performs its second half turn, and the ratchet wheel 225 is advanced one tooth by the cooperation of the cam 204 with the cam follower 205, the angle lever 206, the link 212, the rocker 216, and the pawl 218, as described in detail above. At the end of the run the figure "one" is indicated by the counting wheel 239. The cycle may then continue in the afore-described manner.

If, instead of a sale, some other transaction is to be registered, such as the refunding of cash to a customer returning merchandise, the cashier posts the amount to be refunded into the keys 21 and then enters the amount into the proper adding mechanism by depressing the "refund" key 9 of the adding-mechanism selector bank 7. During the resulting machine run, the pawl 218 is kept out of engagement with the ratchet wheel 225 in the same manner as described above in connection with the machine run released by selector key 11 for registering an amount of money paid by a customer. That is, the cam disc 324 is rotated into a position in which the pin 325 is engaged by the cam face portion 329, and the releasing lever 222 is pressed against the portion 221 of pawl 218. The item counting mechanism remains in the "zero" position.

The item counting device of my invention thus automatically operates to reset the counting wheels 239 and 243 from a previously occupied position to "zero" only when the first item of a subsequent transaction is being registered, and to thereafter commence the counting of new series of sales items only when the next transaction is a sale, whereas the "zero" position is left unchanged if an operation other than an item posting transaction is performed.

To facilitate checking and wrapping the goods sold, or in the event of disagreement between cashier and customer as to the number of items billed, this number can be read from the cash register even after all calculating and money transactions connected with the sale have been completed. When this stage is reached, the item counting device issues a signal to indicate that the number of items posted will be cleared from the machine in the next posting operation.

The illustrated embodiment of my invention is intended for applications in which the number of items to be counted will not usually exceed one hundred. The device can obviously be modified to indicate numbers of items which have three or more digits by including a corresponding number of ratchet wheels and counting wheels and giving the pawl 213 the same number of pawl tongues. Furthermore, a cash register or other business machine according to the invention may be equipped with more than one transaction selector bank, or more than one adding mechanism selector bank. Each additional bank may be connected in the disclosed manner with an additional cam disc which will cooperate with the discs 320 and 324 to control the movements of the release lever 222. The mechanism disclosed may further be modified to simultaneously drive and control a plurality of item counting devices or groups of such devices.

I claim:

1. With a sales registering business machine having an amount keyboard for posting the amount of a transaction, totalizer selecting key mechanisms for entering the posted amounts into selected totalizers, said key mechanisms including selective transaction control keys for controlling the entry of individual posted amounts into selected totalizers for respective classes of items to be registered and having a totalizer key for concluding a multiple-item sales transaction, the combination of an item counting device comprising indicator wheels having a sequence of numerals indicative of the number of sales items entered, an indicator drive operatively connected with said wheels for advancing them one number at a time, transmission means connecting said indicator drive with said totalizer selecting mechanisms of said totalizer selecting keys whereby actuation of any one of said latter keys causes said indicator wheels to advance one number when a sales item is being entered, normally inactive reset means for resetting said indicator wheels to zero indication, and a transmission connecting said reset means with said totalizer selecting mechanisms and comprising control means operatively connected with said totalizer key for causing said transmission to operate said reset means from said totalizer selecting mechanisms in dependence upon preceding actuation of said totalizer key, whereby the number of items is kept indicated after termination of a sales transaction by actuation of said totalizer key and is cleared to zero only when a new transaction is being entered by actuation of said totalizer selector mechanisms, whereafter the counting of items commences only when the next transaction is due to actuation of a sales registering key.

2. With a sales registering business machine having an amount keyboard for posting the amount of a transaction, totalizer selecting key mechanisms for entering the posted amounts into selected totalizers, said key mechanisms including selective transaction control keys for controlling the entry of individual posted amounts into selected totalizers for respective classes of items to be registered and having a totalizer key for concluding a multiple-item sales transaction, the combination of an item counting device comprising indicator wheels for indicating the number of sales items entered, an indicator drive operatively connected with said wheels for advancing them one number at a time, transmission means connecting said indicator drive with said totalizer selecting mechanisms of said totalizer selecting keys whereby actuation of any one of said latter keys causes said indicator wheels to advance one number when a sales item is being entered, normally inactive reset means for resetting said indicator wheels to zero indication, control means for actuating said reset means, said control means having drive structure connected with said totalizer selecting key mechanisms and having normally inactive coupling means interposed between said drive structure and said reset means and operatively connected with said totalizer key to be actuated when said latter key is depressed, whereby said item counting device remains in indicating condition after termination of a sales transaction by actuation of said totalizer key and is cleared to zero only when a new transaction is being entered by actuation of said computer selector mechanisms, whereafter the counting of items commences only when the next transaction is due to actuation of a sales registering key.

3. An item counting device according to claim 2, comprising an optical signal active from the conclusion of a sales transaction to the entering of a new item, a control switch connected with said signal, and cam means connected with said drive structure under control by said coupling means for operating said switch to actuate said signal.

4. In an item counting device according to claim 1, said indicator drive comprising a ratchet gear coaxially joined with each indicator wheel, a ratchet pawl engageable with said ratchet gear, said machine having a shaft adapted to perform a single revolution for each machine run released by any one of said selector keys and control keys, said shaft being in reciprocating driving connection with said pawl; said reset means comprising spring means tending to rotate said ratchet gear back to zero position, and detent means normally engaging said ratchet gear for retaining it in indicating position; said transmission connecting said detent means with said computer selecting mechanisms.

5. In an item counting device according to claim 4, said reciprocating driving connection comprising a rocker rotatable in coaxial relation to said ratchet gear, a cam on said shaft, and a linking mechanism linked to said rocker and having a cam follower engaging said cam for rocking said rocker once during each full rotation of said shaft; said ratchet pawl being pivotally mounted on said rocker and having a spring urging said pawl into engagement with said ratchet gear.

6. In an item counting device according to claim 4, said reciprocating driving connection comprising a cam on said shaft and cam follower means linking said cam with said pawl for reciprocating it once during each full rotation of said shaft, said pawl having spring means biasing it into engagement with said ratchet gear, a pawl release member engageable with said pawl for lifting it off said ratchet gear to prevent advance of said gear, a plurality of pawl control cams for selectively actuating said release member, and connecting means joining said pawl control cams with respective ones of said computer selecting key mechanisms, whereby said item counting device is prevented from counting items when other than said sales-registering keys are depressed.

7. In an item counting device according to claim 4, said transmission comprising a detent control cam on said shaft, and a cam follower device engageable with said detent control cam and linked to said detent means.

8. In an item counting device according to claim 7, said detent control cam being loosely rotatable on said shaft, a coupling member rigidly mounted on said shaft, an entrainer pivotally mounted on said coupling member and having a pivot radially spaced from the axis of said shaft, said entrainer being entrainingly engageable with said detent control cam by motion about said pivot under control by said computer selecting mechanisms.

9. An item counting device according to claim 8, comprising a cam segment joined with said detent control cam to rotate together therewith, said control means operatively connected with said totalizer key comprising means engageable with said entrainer for pivoting it into entraining engagement with said detent control cam, cam follower means engageable with said segment during about one-half rotation of said detent control cam, and a signal switch controlled by said cam follower means to indicate completion of a sales transaction.

10. In an item counting device according to claim 9, said control means operatively connected with said totalizer key comprising a rocking lever having a stationary pivot axis and being movable into the path of rotation of said entrainer for pivoting it into said entraining engagement, a latch lever engageable with said rocking lever for moving it into said path, said latch lever having a stationary pivot axis and being movable about said pivot axis into and out of engagement with said rocking lever under control by said computer selecting mechanisms.

11. An item counting device according to claim 10, comprising a latch control cam firmly mounted on said shaft and a follower biased toward said latch control cam and connected wtih said latch lever whereby said latch lever is capable of pivotal motion only when released by said latch control cam, a toothed control disc rotatable to respectively different positions under control by the transaction control keys, and a feeler member connected with said latch lever and movable toward the teeth of said control disc, whereby said latch lever when released by said latch control cam is permitted to move only when said control disc is in given rotary positions depending upon which particular transaction control key is depressed.

12. In an item counting device according to claim 4, said ratchet gear being ring shaped and having external ratchet teeth engageable by said pawl and having an internal circle of teeth, said spring means comprising a spiral spring coaxially inside said ring-shaped ratchet gear and having a fixed mounting at one spring end, the other end of said spring being in engagement with said internal circle of teeth so as to jump over one of said latter teeth in the event of overloading of said spring.

13. In an item counting device according to claim 4, sadi ratchet gear being rotatably adjustable for setting the tension of said spring to a desired value.

14. An item counting device according to claim 1, comprising two of said indicator wheels coaxially adjacent to each other, said indicator drive having two ratchet gears coaxially adjacent to each other and joined with said respective two indicator wheels, a ratchet pawl having two ratchet tongues for engagement with said respective ratchet gears, said transmission means having a reciprocable rocker on which said pawl is pivotally mounted for entrainment of said ratchet gears during the forward stroke of said rocker, one of said ratchet gears having peripherally behind the tenth tooth a deeper tooth gap than behind the preceding nine teeth, one of said pawl tongues being continuously engageable with said teeth of said one ratchet gear, and said other pawl tongue being engaged with said other ratchet gear only when said one tongue enters into said deeper gap, whereby said other ratchet gear advances one step for each tenth step of said one ratchet gear.

15. In an item counting device according to claim 5, said detent means comprising a pivotally mounted detent member having two noses of which one is temporarily engageable with said ratchet gear, said ratchet gear having a laterally protruding zero-reset pin, and said other nose of said detent member being continuously located in the path of said reset pin.

References Cited in the file of this patent
UNITED STATES PATENTS

| | | |
|---|---|---|
| 2,635,808 | Stowell et al. | Apr. 21, 1953 |
| 2,868,446 | Harbor | Jan. 13, 1959 |